(12) United States Patent
Zeng et al.

(10) Patent No.: US 11,500,218 B2
(45) Date of Patent: Nov. 15, 2022

(54) THREE-PORT SILICON BEAM SPLITTER CHIP AND ITS FABRICATION METHOD

(71) Applicants: Chongqing Institute of East China Normal University, Chongqing (CN); University of Shanghai for Science and Technology, Shanghai (CN); East China Normal University, Shanghai (CN)

(72) Inventors: Heping Zeng, Chongqing (CN); Jijun Feng, Chongqing (CN); Xinyao Wu, Chongqing (CN)

(73) Assignees: CHONGQING INSTITUTE OF EAST CHINA NORMAL UNIVERSITY, Chongqing (CN); UNIVERSITY OF SHANGHAI FOR SCIENCE AND TECHNOLOGY, Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 315 days.

(21) Appl. No.: 17/038,732

(22) Filed: Sep. 30, 2020

(65) Prior Publication Data

US 2021/0132401 A1 May 6, 2021

(30) Foreign Application Priority Data

Sep. 30, 2019 (CN) .......................... 201910944669.9

(51) Int. Cl.
*G02B 27/10* (2006.01)
*G02B 6/125* (2006.01)
*G02B 6/13* (2006.01)

(52) U.S. Cl.
CPC ........... *G02B 27/106* (2013.01); *G02B 6/125* (2013.01); *G02B 6/13* (2013.01)

(58) Field of Classification Search
CPC ........ G02B 2006/12061; G02B 27/106; G02B 6/125; G02B 6/13; G02B 6/2813
See application file for complete search history.

(56) References Cited

U.S. PATENT DOCUMENTS

2018/0172913 A1* 6/2018 Lin ...................... G02B 6/2726

FOREIGN PATENT DOCUMENTS

CN 106094199 11/2016

OTHER PUBLICATIONS

SIPO, First Office Action for ON Application No. 201910944669.9, dated Apr. 27, 2020.

* cited by examiner

*Primary Examiner* — Joseph P Martinez
*Assistant Examiner* — Vipin Patel
(74) *Attorney, Agent, or Firm* — Hodgson Russ LLP

(57) ABSTRACT

A three-port silicon beam splitter chip includes an input waveguide, three output waveguides, and a coupling region disposed between the input waveguide and the output waveguides and being in a square shape. The input waveguide and the output waveguide have a same width K, where 490 nm<K<510 nm, the coupling region, the input waveguide and the output waveguide have a same thickness H, where 210 nm<H<230 nm, and the coupling region has a length L, where 1600 nm<L<2000 nm. The three-port silicon beam splitter chip of the present disclosure has a high integration degree and a small size, and is capable of improving the portability of the wavefront reconstruction device.

10 Claims, 4 Drawing Sheets

THREE-PORT SILICON BEAM SPLITTER CHIP AND ITS FABRICATION METHOD

TECHNICAL FIELD

The present disclosure relates to a field of integrated photonic devices, in particular to a silicon beam splitter technology.

BACKGROUND

The laser wavefront reconstruction technology is widely used in applications related to laser processing, such as personalized wavefront guidance of laser in situ keratomileusis for myopia. Wavefront reconstruction refers to a process of extract the phase information from processed light field intensity of a surface for an imaged object and subjecting the phase information to decomposition and reconstruction. A beam splitter is commonly used for the wavefront reconstruction. However, miniaturization and various functions of a wavefront reconstruction imaging system has always been a challenge in the art. A silicon optoelectronic device is widely used in applications such as reconstruction, quantum control and optical computing due to its advantages in energy consumption, performance, size and cost. However, there is still a need for the silicon photonics to reduce device size while still maintaining high performance.

CN105334575A discloses a silicon-based metamaterial optical beam splitter and a manufacturing method thereof. The silicon-based metamaterial optical beam splitter includes a substrate. The substrate includes an input waveguide and two output waveguides. There is a coupling region composed of N*N pixel blocks of the same size between the input waveguide and the output waveguide. By punching the pixel blocks, a special punching array is formed through an optimization algorithm. Due to the fact that configuration of an air hole array having a sub-wavelength size can be equivalent to an evenly decreased refractive index distribution area, different wavelengths can be guided simultaneously, so that the goal of effectively outputting the different wavelengths at an output port can be achieved, and the goal of large working bandwidth is achieved. For most of the silicon beam splitters, there are an input waveguide, a coupling region and two output waveguides. A three-port silicon beam splitter is rarely reported. A traditional three-port beam splitter has a large size, which is not conducive to portability, and has high energy consumption, high cost and low performance. Meanwhile, the three-port beam splitter designed on the basis of the traditional waveguide theory usually has a split ratio of 1:2:1.

SUMMARY

An object of the present disclosure is to provide a three-port silicon beam splitter with a high integration degree and a small size, which is capable of improving portability of a wavefront reconstruction device.

In order to achieve the above object, the present disclosure provides a three-port silicon beam splitter chip, including: an input waveguide, three output waveguides, and a coupling region disposed between the input waveguide and the output waveguides and being in a square shape. The input waveguide and the output waveguide have a same width K, where 490 nm<K<510 nm, the coupling region, the input waveguide and the output waveguide have a same thickness H, where 210 nm<H<230 nm, and the coupling region has a length L, where 1600 nm<L<2000 nm.

Further, the coupling region consists of N*N pixel structures. The pixel structures include silicon pixel structures and silicon dioxide pixel structures. The silicon pixel structures and the silicon dioxide pixel structures are discretely distributed in the coupling region. The silicon pixel structure and the silicon dioxide pixel structure have a same size.

Further, the silicon pixel structure and the silicon dioxide pixel structure are non-linearly adjacent to each other or spaced apart from each other in the coupling region.

Further, the three output waveguides are a first output waveguide, a second output waveguide and a third output waveguide. The second output waveguide and the input waveguide are both arranged at an extension line of a symmetry axis of the coupling region along a light incident direction. The first output waveguide and the third output waveguide are arranged at two sides of the second output waveguide, respectively, and are symmetrical with respect to the extension line of the symmetry axis.

Further, the coupling region is divided into a first coupling region and a second coupling region by the symmetry axis. Distribution of the silicon pixel structures and the silicon dioxide pixel structures in the first coupling region and distribution of the silicon pixel structures and the silicon dioxide pixel structures in the second coupling region are symmetrical with respect to the symmetry axis.

Further, the thickness H is 220 nm, the length L is 1800 nm, and the width K is 500 nm.

Further, the coupling region consists of 18*18 pixel structures, and each of the pixel structures has a length of 100 nm and a thickness of 220 nm. The pixel structure is located at x-y, where x represents an $x^{th}$ row and is an integer, $1 \leq x \leq 18$, and y represents a $y^{th}$ column and is an integer, $1 \leq y \leq 18$.

In the first coupling region, the silicon dioxide pixel structures are located at: 1-3, 1-4, 1-6, 1-9, 1-10, 1-12, 1-13, 1-15, 1-17, 1-18, 2-1, 2-2, 2-3, 2-4, 2-5, 2-6, 2-9, 2-10, 2-15, 7-1, 7-2, 7-7, 7-9, 7-14, 7-16, 7-17, 7-18, respectively.

In the second coupling region, the silicon dioxide pixel structures are located at: 12-1, 12-2, 12-7, 12-9, 12-14, 12-16, 12-17, 12-18, 17-1, 17-2, 17-3, 17-4, 17-5, 17-6, 17-9, 17-10, 17-15, 18-3, 18-4, 18-6, 18-9, 18-10, 18-12, 18-13, 18-15, 18-17, 18-18, respectively.

The silicon pixel structures are located at remaining positions of the first coupling region and the second coupling region.

Further, the three-port silicon beam splitter chip has a wave band of 1550 nm.

The present disclosure further provides a fabrication method of a three-port silicon beam splitter chip, and the fabrication method includes:

(S1) forming an input waveguide, three output waveguides and a coupling region on a silicon substrate, and dividing the coupling region between the input waveguide and the output waveguide into N*N pixel structures, in which the pixel structures include silicon pixel structures and silicon dioxide pixel structures, and the silicon pixel structures and the silicon dioxide pixel structures are discretely distributed in the coupling region;

(S2) setting a target parameter and a structural variable and building a model with the target parameter and the structural variable, in which the target parameter is a transmittance of an output port of each output waveguide and is set as 0.33, and the structural variable is a variable indicating a discrete distribution structure of the silicon pixel structures and the silicon dioxide pixels (311) in the coupling region; and (S3) determining, according to the structural variable, an optimal discrete distribution structure of the silicon pixel structures and the silicon dioxide pixel structures in the coupling region with an iterative optimization.

Further, the step (S2) includes:

(S201) corresponding each pixel structure to a binary bit and converting the structural variable into N N-bit binary numbers, in which "1" represents a silicon pixel structure, "0" represents a dioxide silicon pixel structure, N pixel structures of each row of the coupling region (3), that is made up of 1 and 0, form an N-bit binary number, and the coupling region has N rows to form a total of N N-bit binary numbers; and (S202) applying a particle swarm optimization and establishing a target function FOM formula of: FOM=(T1−0.33)+(T2−0.33)+(T3−0.33), where T1, T2 and T3 represent actual transmittances of the first, second and third output waveguides, respectively.

Compared with related technologies, the present disclosure has the following advantages.

The three-port silicon beam splitter chip of the present disclosure has a high integration degree and a small size, and is capable of improving the portability of the wavefront reconstruction device. By designing the symmetry structure, the complex structure distribution design is simplified. With the reversal design, the interference region is subjected to discretization and coding, not only omitting the tedious waveguide theoretical reasoning process for the designed method based on machine learning, but also obtaining the optimal distribution structure through iterative optimization methods, thus obtaining the three-port silicon beam splitter chip with high performances. With the reasonable design, when vertical polarized light having a wave band of 1550 nm is incident, a split ratio of the three ports of the beam splitter chip is 1:1:1.

In drawings:
1—input waveguide;
2—output waveguide, 21—first output waveguide, 22—second output waveguide, 23—third output waveguide;
3—coupling region, 31—pixel structure; 310—silicon pixel structure, 311—silicon dioxide pixel structure, 32—first coupling region, 33—second coupling region;
Q—symmetry axis.

DETAILED DESCRIPTION

Embodiments of the present disclosure are described in detail below with reference to drawings.

Figure 1:
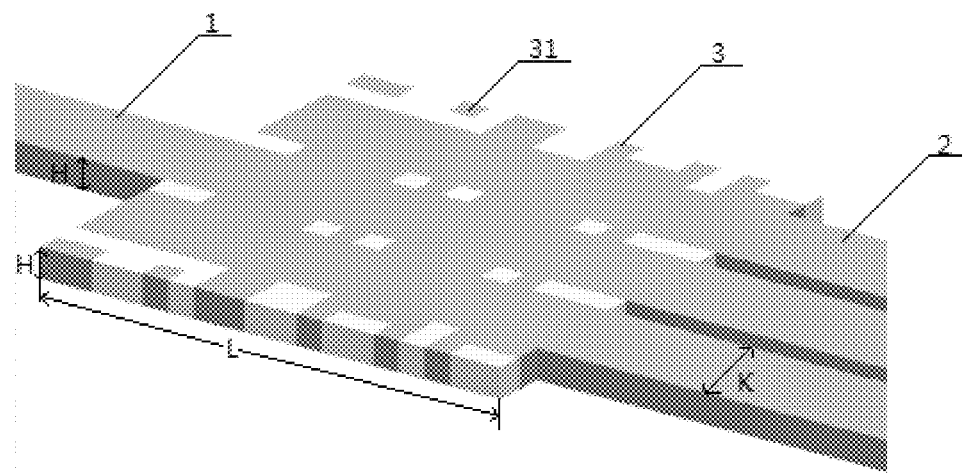
FIG. 1 is a schematic diagram of a three-port silicon beam splitter chip according to an embodiment of the present disclosure.
Figure 2:
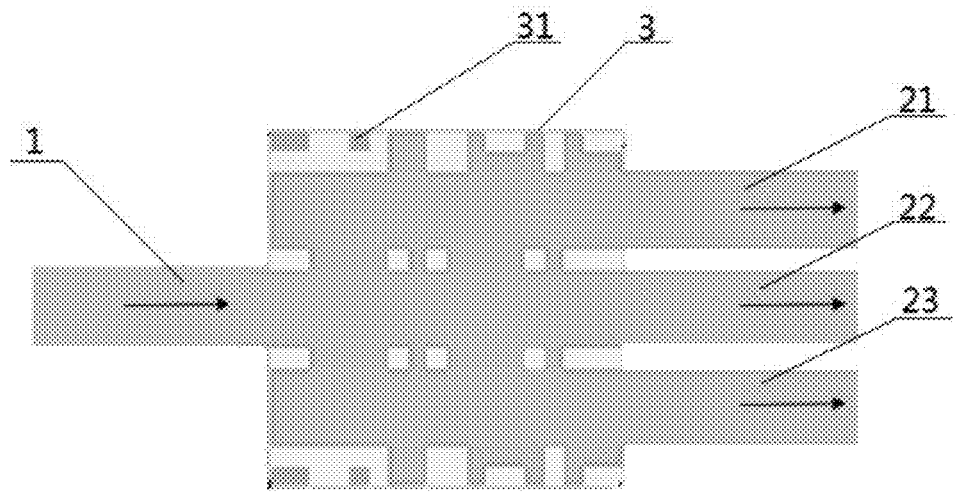
FIG. 2 is a top view of FIG. 1.

As shown in FIGS. 1 and 2, the present disclosure provides in embodiments a three-port silicon beam splitter chip, including: an input waveguide 1, three output waveguides 2, and a coupling region 3 disposed between the input waveguide 1 and the output waveguides 2 and being in a square shape.

The input waveguide 1 and the output waveguide 2 have a same width K, where 490 nm<K<510 nm. The coupling region 3, the input waveguide 1 and the output waveguide 2 have a same thickness H, where 210 nm<H<230 nm. The coupling region 3 has a length L, where 1600 nm<L<2000 nm. The three-port silicon beam splitter chip is applied in the wavefront reconstruction, and has a small size, a compact structure and high performances.

The silicon pixel structure and the silicon dioxide pixel structure are non-linearly adjacent to each other or spaced apart from each other in the coupling region.

The three output waveguides 2 are a first output waveguide 21, a second output waveguide 22 and a third output waveguide 23. The second output waveguide 22 and the input waveguide 1 are both arranged at an extension line of a symmetry axis Q of the coupling region 3 along a light incident direction. The first output waveguide 21 and the third output waveguide 23 are arranged at two sides of the second output waveguide 22, respectively, and are symmetrical with respect to the extension line of the symmetry axis Q. The symmetrical arrangement of the coupling region 3, the first output waveguide 21, the second output waveguide 22 and the third output waveguide 23 may simplify the process design and the fabrication steps.

Figure 3:
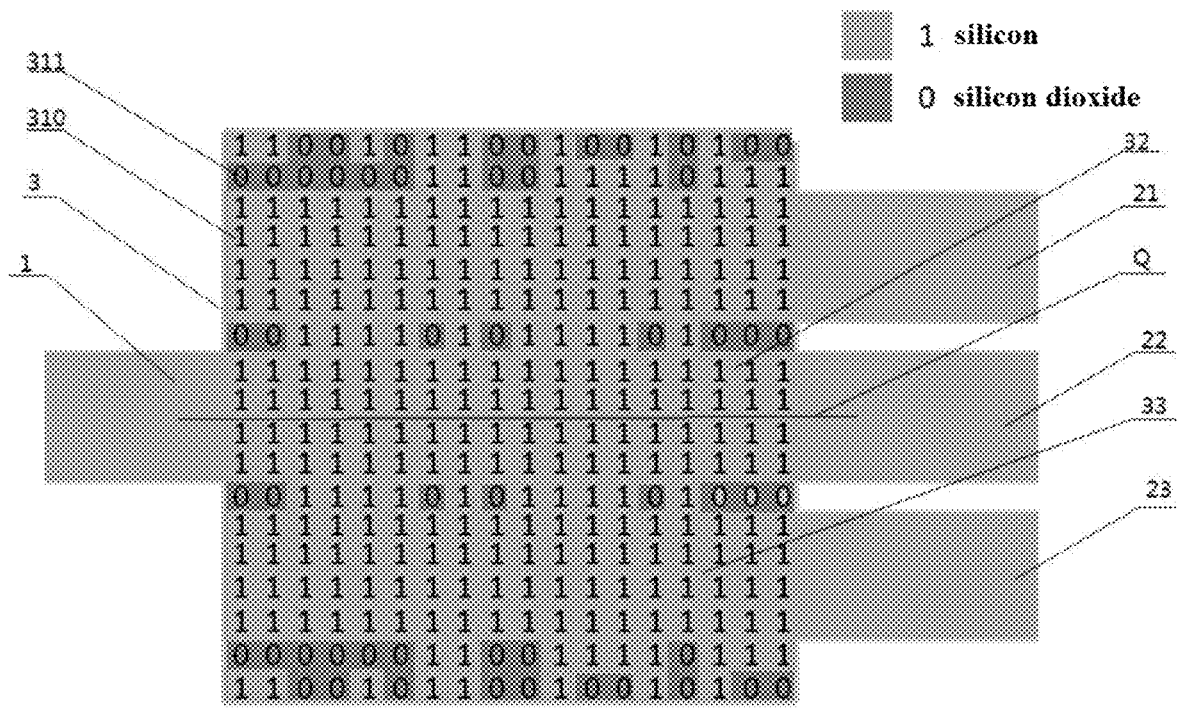
FIG. 3 is a schematic diagram of pixel distribution in a coupling region of FIG. 1.

As shown in FIG. 3, the coupling region 3 consists of N*N pixel structures 31, the pixel structures 31 include silicon pixel structures 310 and silicon dioxide pixel structures 311. The silicon pixel structures 310 and the silicon dioxide pixel structures 311 are discretely distributed in the coupling region 3, and the silicon pixel structure 310 and the silicon dioxide pixel structure 311 have a same size. The discrete distribution of the silicon pixel structures and the silicon dioxide pixel structures may increase the light transmittance from the input waveguide to the three output waveguides. The discretization distribution means that the silicon pixel structures 310 and the silicon dioxide pixel structures 311 are regarded as points, and the silicon pixel structures 310 and the silicon dioxide pixel structures 311 are non-linearly adjacent to each other or spaced apart from each other in the coupling region 3.

The coupling region 3 is divided into a first coupling region 32 and a second coupling region 33 by the symmetry axis Q. Distribution of the silicon pixel structures 310 and the silicon dioxide pixel structures 311 in the first coupling region 32 and distribution of the silicon pixel structures 310 and the silicon dioxide pixel structures 311 in the second coupling region 33 are symmetrical with respect to the symmetry axis Q, thus simplifying the design of the discretization distribution structure and maintaining the high performance of the three-port silicon beam splitter chip.

The thickness H is 220 nm, the length L is 1800 nm, and the width K is 500 nm.

The coupling region 3 consists of 18*18 pixel structures 31, and each of the pixel structures 31 has a length of 100 nm and a thickness of 220 nm.

The pixel structure 31 is located at x-y, where x represents an $x^{th}$ row and is an integer, $1 \leq x \leq 18$, and y represents a $y^{th}$ column and is an integer, $1 \leq y \leq 18$.

In the first coupling region 32, the silicon dioxide pixel structures 311 are located at: 1-3, 1-4, 1-6, 1-9, 1-10, 1-12, 1-13, 1-15, 1-17, 1-18, 2-1, 2-2, 2-3, 2-4, 2-5, 2-6, 2-9, 2-10, 2-15, 7-1, 7-2, 7-7, 7-9, 7-14, 7-16, 7-17, 7-18, respectively.

In the second coupling region 33, the silicon dioxide pixel structures 311 are located at: 12-1, 12-2, 12-7, 12-9, 12-14, 12-16, 12-17, 12-18, 17-1, 17-2, 17-3, 17-4, 17-5, 17-6, 17-9, 17-10, 17-15, 18-3, 18-4, 18-6, 18-9, 18-10, 18-12, 18-13, 18-15, 18-17, 18-18, respectively.

The silicon pixel structures 310 are located at remaining positions of the first coupling region 32 and the second coupling region 33.

In the coupling region 3, the first row to the eighteenth row are arranged from top to bottom, and the first column to the eighteenth column are arranged from left to right. A distance between the second output waveguide 22 and the first output waveguide 21 or the third output waveguide 23 is 100 nm. The three-port silicon beam splitter chip is set to have the above structure and has a split ratio of 1:1:1, a low optical loss, and a high transmission efficiency.

The three-port silicon beam splitter chip of the present disclosure may be fabricated by the following fabrication method of the three-port silicon beam splitter chip. As shown in FIG. 3, the fabrication method of the three-port silicon beam splitter chip includes the following steps:

(S1) forming an input waveguide, three output waveguides and a coupling region on a silicon substrate, and dividing the coupling region between the input waveguide and the output waveguide into N*N pixel structures, in which the pixel structures include silicon pixel structures and silicon dioxide pixel structures, and the silicon pixel structures and the silicon dioxide pixel structures are discretely distributed in the coupling region;

(S2) setting a target parameter and a structural variable and building a model with the target parameter and the structural variable, in which the target parameter is a transmittance of an output port of each output waveguide and is set as 0.33, and the structural variable is a variable indicating a discrete distribution structure of the silicon pixel structures and the silicon dioxide pixels (311) in the coupling region; and (S3) determining, according to the structural variable, an optimal discrete distribution structure of the silicon pixel structures and the silicon dioxide pixel structures in the coupling region with an iterative optimization.

The step (S2) includes:

(S201) corresponding each pixel structure to a binary bit and converting the structural variable into N N-bit binary numbers, in which "1" represents a silicon pixel structure, "0" represents a dioxide silicon pixel structure, N pixel structures of each row of the coupling region (3), that is made up of 1 and 0, form an N-bit binary number, and the coupling region has N rows to form a total of N N-bit binary numbers; and (S202) applying a particle swarm optimization and establishing a target function FOM formula of: FOM=(T1−0.33)+(T2−0.33)+(T3−0.33), where T1, T2 and T3 represent actual transmittances of the first, second and third output waveguides, respectively. Values of T1, T2 and T3 should be close to the target parameter, to make the value of the function FOM as small as possible.

As shown in FIG. 3, shown is a three-port silicon beam splitter chip with a thickness of 220 nm, a length of 1800 nm and a width of 500 nm. The coupling region is divided into 18*18 pixel structures 31, and each row consists of 18 pixel structures represented by 1 and/or 0 to form an 18-bit binary number, resulting in a total of 18 18-bit binary numbers. A value of each 18-bit binary number is in a range of 0 to 131071, and 131071 is a result of $2^{18-1}$.

Since the beam splitter having a structure of one input waveguide and three output waveguides with a split ratio of 1:1:1 is symmetrical, 18 variables may be reduced to 9 variables. The coupling region 3 is divided into the first coupling region 32 and the second coupling region 33 with respect to the symmetry axis Q. Distribution of the silicon pixel structures 310 and the silicon dioxide pixel structures 311 in the first coupling region 32 and distribution of the silicon pixel structures 310 and the silicon dioxide pixel structures 311 in the second coupling region 33 are symmetrical with respect to the symmetry axis Q.

The coupling region 3 is divided into the first coupling region 32 and the second coupling region 33 by the symmetry axis. The pixel structure 31 is located at x-y, where x represents an $x^{th}$ row and is an integer, $1 \leq x \leq 18$, and y represents a $y^{th}$ column and is an integer, $1 \leq y \leq 18$. The optimal distribution of the silicon pixel structures 310 and the silicon dioxide pixel structures 311 in the coupling region 3 may be determined by an iterative optimization, and the distribution may be as follows.

In the first coupling region 32, the silicon dioxide pixel structures 311 are located at: 1-3, 1-4, 1-6, 1-9, 1-10, 1-12, 1-13, 1-15, 1-17, 1-18, 2-1, 2-2, 2-3, 2-4, 2-5, 2-6, 2-9, 2-10, 2-15, 7-1, 7-2, 7-7, 7-9, 7-14, 7-16, 7-17, 7-18, respectively.

In the second coupling region 33, the silicon dioxide pixel structures 311 are located at: 12-1, 12-2, 12-7, 12-9, 12-14, 12-16, 12-17, 12-18, 17-1, 17-2, 17-3, 17-4, 17-5, 17-6, 17-9, 17-10, 17-15, 18-3, 18-4, 18-6, 18-9, 18-10, 18-12, 18-13, 18-15, 18-17, 18-18, respectively.

The silicon pixel structures 310 are located at remaining positions of the first coupling region 32 and the second coupling region 33.

9 variables obtained from the above iterative optimization are 208020, 3319, 262143, 262143, 262143, 262143, 62952, 262143, 262143, respectively, from top to bottom in the first coupling region 32 or from bottom to top in the second coupling region (33).

Figure 4:
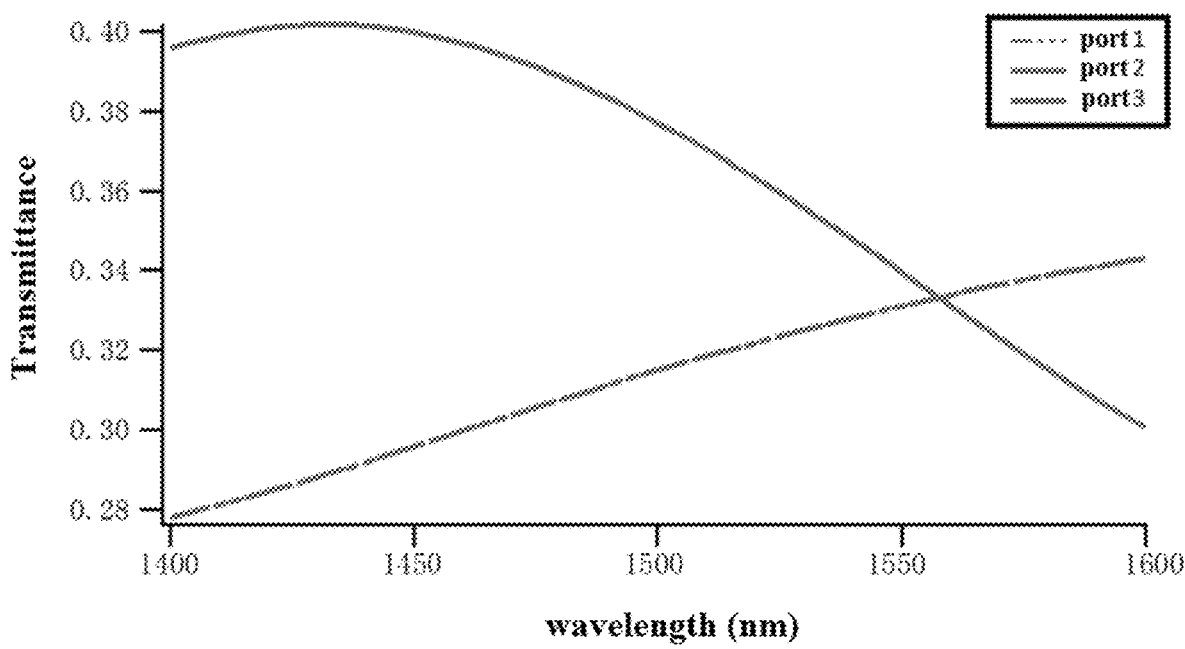
FIG. 4 is a graph showing a relationship between transmittances of three output waveguides of FIG. 3 and wavelength.
Figure 5:
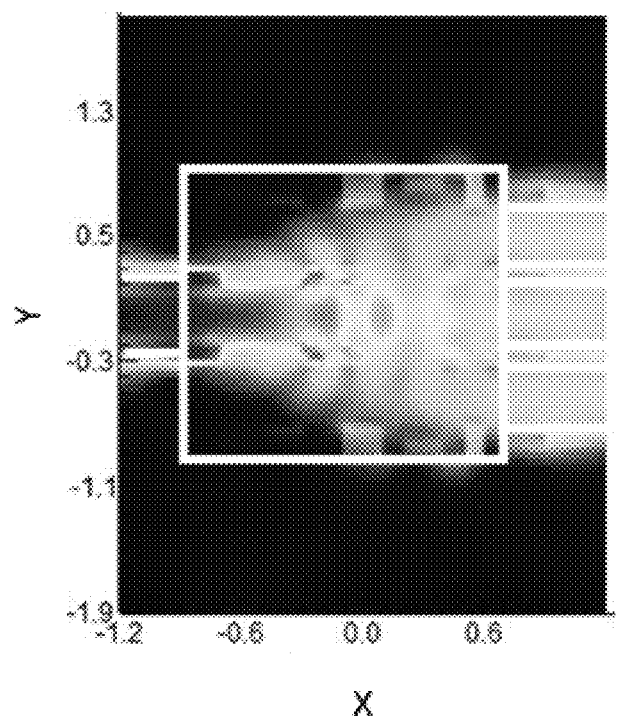
FIG. 5 is a schematic diagram of a light field distribution of a simulation corresponding to a discretized distribution structure of FIG. 3, where a gray scale indicates intensity of the light field distribution.

A relationship between transmittance of the output waveguide and wavelength is detected and obtained. As shown in FIG. 4, transmittances of ports 1, 2 and 3 are changed with the wavelength, and curves of port 2 and port 3 are substantially overlapped with each other. A three-port beam splitter chip with a vertical polarization incident light having a wavelength of about 1550 nm has an optimal performance. In this case, values of the three output waveguides at the wavelength of 1550 nm from top to bottom are 0.329, 0.336, and 0.334, respectively. The sum of the three transmittances is equal to 0.999. The light is output through the three-port silicon beam splitter chip to realize a high transmittance and a small loss, and the three output ports of the beam splitter have a light intensity split ratio of 1:1:1.

Figure 6:
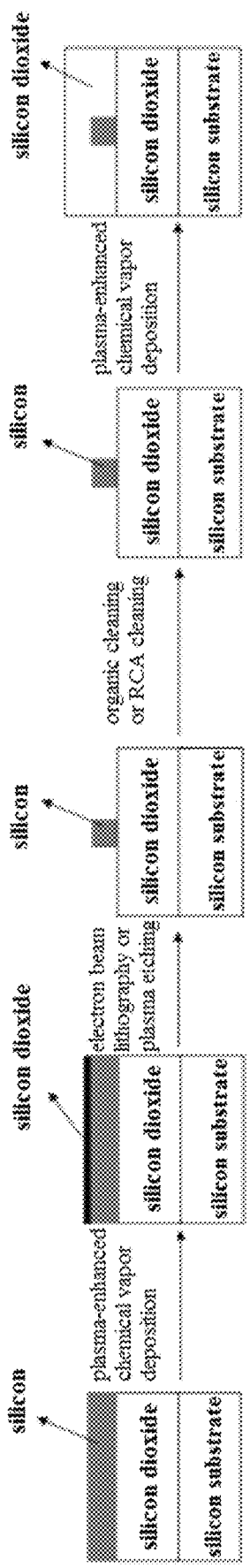
FIG. 6 is a flow chart of a fabrication process of a three-port silicon beam splitter chip of the present disclosure.

As shown in FIG. 6, for a standard silicon-on-insulator (SOI) wafer, a silicon dioxide layer with a thickness of 100 nm is provided as an etching mask through evaporation deposition by a plasma-enhanced chemical vapor deposition facility. Photoresist is then coated on the silicon dioxide layer and the waveguide pattern can be prepared by electron beam lithography. After pattern transferred to the silicon dioxide layer by plasma etching, the remaining photoresist is removed and then the silicon waveguide can be fabricated with the silicon dioxide mask, while an etching depth is monitored. After organic cleaning is performed on surface of a fabricated sample, the remaining silicon dioxide mask is removed in a hydrofluoric acid solution. Further, standard RCA cleaning for the silicon material is performed. A silicon dioxide layer with a thickness of 2 μm is deposited as a cladding layer by plasma enhanced chemical vapor deposition. Finally, a back surface of this fabricated device is polished and the device is cut for performance characterization.

External vibration cannot be avoided during the testing and future use of the chip. Due to the precision of chip fabricating, effectiveness of fiber coupling may be related to the performances of the chip, and the vibrations may even damage the chip. In order to improve the mechanical stability of the system and reduce the coupling damage of the fiber-waveguide chip, the chip may be encapsulated.

Surfaces of the optical fibers and the optical waveguides are cleaned with isopropanol and dried by blowing. The waveguides are placed on a platform of the encapsulating system and fixed with a special fixture. The optical fibers are arranged on three-dimensional adjustment stages at both sides of the waveguide platform, which are connected to the waveguides, respectively. After this, a light source is connected to an input fiber, and an optical power meter is connected to the output fiber. In this process, a clean glass rod with a hemispherical front end attached with a liquid matched with refractive index is used to apply the liquid to the end surface of the input optical fiber to naturally form a bead shape. The end surface of the input side may be further adjusted in parallel. For the waveguides and optical fibers with good end surfaces, the parallel adjustment may be easy to achieve by micromanipulation. The refractive index matching liquid bead is placed between two end surfaces, and the position of the bead is related to the angle between the two end surfaces due to the effect of the surface tension. Angle adjustment operation may be performed by the microscopy system to allow the two end surfaces to be parallel. The end surfaces at the output side are adjusted in parallel, and the adjustment of the output side may be performed by the microscope system in the similar way to the above-mentioned input side.

After the above operations, a light having a test wavelength is input from the light source, and the positions of the end surfaces of the fibers at both input and output sides are adjusted by moving the platform until the output optical power is maximized. At this time, the optimal coupling position is obtained to ensure that the encapsulated chip achieves the optimal performances. After this, PB300 UV curing adhesive may be coated on the end surfaces of the waveguides, and is cured by ultraviolet light irradiation for 180 s, and further dried at 50° C. for 8 hours to be cured. An obtained device may be put into a box, and the box is sealed by a cover with glue. Tail fibers are straightened out and sealed with rubber plugs. Tail fibers from the input and output ports are melted and connected to an optical fiber jumper, and put into the plastic box. The fibers may be coiled and a head of the fiber jumper is taken out.

The three-port silicon beam splitter chip of the present disclosure has a high integration degree and a small size, and is capable of improving the portability of the wavefront reconstruction device. By designing the symmetry structure, the complex structure distribution design is simplified. With the reversal design, the interference region is subjected to discretization and coding, not only omitting the tedious waveguide theoretical reasoning process for the designed method based on machine learning, but also obtaining the optimal distribution structure through iterative optimization methods, thus obtaining the three-port silicon beam splitter chip with high performances. With the reasonable design, when vertical polarized light having a wave band of 1550 nm is incident, a split ratio of the three ports of the beam splitter chip is 1:1:1.

What is claimed is:

1. A three-port silicon beam splitter chip, comprising:
an input waveguide, three output waveguides, and a coupling region disposed between the input waveguide and the output waveguides and being in a square shape, wherein:
the input waveguide and the output waveguides have a same width K, where 490 nm<K<510 nm,
the coupling region, the input waveguide and the output waveguides have a same thickness H, where 210 nm<H<230 nm, and the coupling region has a length L, where 1600 nm<L<2000 nm.

2. The three-port silicon beam splitter chip according to claim 1, wherein:
the coupling region consists of N*N pixel structures,
the pixel structures comprise silicon pixel structures and silicon dioxide pixel structures,
the silicon pixel structures and the silicon dioxide pixel structures are discretely distributed in the coupling region, and
the silicon pixel structures and the silicon dioxide pixel structures have a same size.

3. The three-port silicon beam splitter chip according to claim 2, wherein the silicon pixel structures and the silicon dioxide pixel structures are non-linearly adjacent to each other or spaced apart from each other in the coupling region.

4. The three-port silicon beam splitter chip according to claim 3, wherein;
the three output waveguides are a first output waveguide, a second output waveguide and a third output waveguide,
the second output waveguide and the input waveguide are both arranged at an extension line of a symmetry axis of the coupling region along a light incident direction, and
the first output waveguide and the third output waveguide are arranged at two sides of the second output waveguide, respectively, and are symmetrical with respect to the extension line of the symmetry axis.

5. The three-port silicon beam splitter chip according to claim 4, wherein;
the coupling region is divided into a first coupling region and a second coupling region by the symmetry axis, and
distribution of the silicon pixel structures and the silicon dioxide pixel structures in the first coupling region and distribution of the silicon pixel structures and the silicon dioxide pixel structures in the second coupling region are symmetrical with respect to the symmetry axis.

6. The three-port silicon beam splitter chip according to claim 5, wherein the thickness H is 220 nm, the length L is 1800 nm, and the width K is 500 nm.

7. The three-port silicon beam splitter chip according to claim 6, wherein the coupling region consists of 18*18 pixel structures, and each of the pixel structures has a length of 100 nm and a thickness of 220 nm;
the pixel structure is located at x-y, where x represents an xth row and is an integer, 1≤x≤18, and y represents a yth column and is an integer, 1≤y≤18;
in the first coupling region, the silicon dioxide pixel structures are located at: 1-3, 1-4, 1-6, 1-9, 1-10, 1-12, 1-13, 1-15, 1-17, 1-18, 2-1, 2-2, 2-3, 2-4, 2-5, 2-6, 2-9, 2-10, 2-15, 7-1, 7-2, 7-7, 7-9, 7-14, 7-16, 7-17, 7-18, respectively;

in the second coupling region, the silicon dioxide pixel structures are located at: 12-1, 12-2, 12-7, 12-9, 12-14, 12-16, 12-17, 12-18, 17-1, 17-2, 17-3, 17-4, 17-5, 17-6, 17-9, 17-10, 17-15, 18-3, 18-4, 18-6, 18-9, 18-10, 18-12, 18-13, 18-15, 18-17, 18-18, respectively; and the silicon pixel structures are located at remaining positions of the first coupling region and the second coupling region.

8. The three-port silicon beam splitter chip according to claim 7, wherein the three-port silicon beam splitter chip has a wave band of 1550 nm.

9. A fabrication method of a three-port silicon beam splitter chip, comprising:
- (S1) forming an input waveguide, three output waveguides and a coupling region on a silicon substrate, and dividing the coupling region between the input waveguide and the output waveguides into N*N pixel structures, wherein the pixel structures comprise silicon pixel structures and silicon dioxide pixel structures, and the silicon pixel structures and the silicon dioxide pixel structures are discretely distributed in the coupling region;
- (S2) setting a target parameter and a structural variable and building a model with the target parameter and the structural variable, wherein the target parameter is a transmittance of an output port of each output waveguide and is set as 0.33, and the structural variable is a variable indicating a discrete distribution structure of the silicon pixel structures and the silicon dioxide pixel structures pixels (311) in the coupling region; and
- (S3) determining, according to the structural variable, an optimal discrete distribution structure of the silicon pixel structures and the silicon dioxide pixel structures in the coupling region with an iterative optimization.

10. The fabrication method according to claim 9, wherein the step (S2) comprises:
- (S201) corresponding each pixel structure to a binary bit and converting the structural variable into N N-bit binary numbers, wherein "1" represents a silicon pixel structure, "0" represents a dioxide silicon pixel structure, N pixel structures of each row of the coupling region, that is made up of 1 and 0, form an N-bit binary number, and the coupling region has N rows to form a total of N N-bit binary numbers; and
- (S202) applying a particle swarm optimization and establishing a target function FOM formula of: FOM=(T1−0.33)+(T2−0.33)+(T3−0.33), where T1, T2 and T3 represent actual transmittances of the first, second and third output waveguides, respectively.

* * * * *